United States Patent [19]

Wood

[11] Patent Number: 4,976,799

[45] Date of Patent: Dec. 11, 1990

[54] METHOD OF PREPARING LAMINATED HOLOGRAMS

[75] Inventor: Glenn P. Wood, Altrincham, United Kingdom

[73] Assignee: Ilford Limited, Knutsford, England

[21] Appl. No.: 448,003

[22] Filed: Dec. 8, 1989

[30] Foreign Application Priority Data

Dec. 20, 1988 [GB] United Kingdom ................. 8829643

[51] Int. Cl.$^5$ ........................ B32B 31/20; B32B 17/10
[52] U.S. Cl. ...................................... 156/106; 156/99; 350/3.7
[58] Field of Search ................ 156/99, 100, 102, 106; 350/3.7; 428/38

[56] References Cited

U.S. PATENT DOCUMENTS 4,842,389 6/1989 Wood et al. ...................... 156/99 X

FOREIGN PATENT DOCUMENTS 2519967 7/1983 France .
59-119376 7/1984 Japan .
59-201080 11/1984 Japan .

*Primary Examiner*—Robert A. Dawson
*Attorney, Agent, or Firm*—Darby & Darby

[57] ABSTRACT

There is described a method of preparing a hologram laminated between two sheets of glass which comprises forming an assembly which comprises a sheet of glass, a sheet of polyvinyl butyral, a film which contains a silver halide hologram, a sheet of polyvinyl butyral and a sheet of glass and then subjecting the assembly of a pressure of between 12 and 15 bars at a temperature about 110° C. which is the softening temperature of polyvinyl butyral.

6 Claims, No Drawings

METHOD OF PREPARING LAMINATED HOLOGRAMS

This invention relates to the mounting of holograms.

Holograms prepared from silver halide holographic material can be of either the reflection type or of the transmission type. In holograms of the reflection type, fringes which carry the holographic information lie approximately parallel to the plane of the hologram. In holograms of the transmission type the fringes are approximately at right angles to the plane of the hologram. It is very important to preserve these fringes as any damage can obliterate all or part of the holographic information stored in the fringes. Slight distortion such as compression can press together the fringes in reflection holograms causing the peak replay wavelength to decrease very appreciably. However, for display purposes it has long been desired to mount holograms between two sheets of glass. This would serve to protect the hologram from physical damage and atmospheric damage such as changes in humidity and temperature. Also it would enable the holograms to be used for usual display purposes, replacing sheets of glass in shower cabinets and reception areas, for example. Various methods using tacky and solvent-based adhesives have been tried to make such a lamination but, in every method tried before this invention, the holographic fringes were destroyed or badly damaged. We have found a way of laminating a hologram between two sheets of glass.

Therefore, according to the present invention there is provided a method of preparing a hologram laminated between two sheets of glass which comprises forming an assembly which comprises a sheet of glass, a sheet of polyvinyl butyral, a film which contains a silver halide hologram, a sheet of polyvinyl butyral and a sheet of glass and then subjecting the assembly to a pressure of between 12 and 15 bars at a temperature above 110° C. which is the softening temperature of polyvinyl butyral. The preferred pressure is about 13 bars. The preferred temperature range is from 110 to 160° C.

Preferably the sheets of polyvinyl butyral are textured to enable any entrapped air to escape from the assembly.

Polyvinyl butyral is known as the adhesive to laminate sheets of glass in the preparation of safety glass for car windscreens. Thus sheets of polyvinyl butyral having a textured surface are readily commercially available. Such sheets of polyvinyl butyral have a thickness between 0.5 mm and 3.0 mm.

To prepare laminated glass using a sheet of polyvinyl butyral, a high pressure and elevated temperature above the softening point of polyvinyl butyral are required to be used. It would have been reasonable to suppose that the holographic fringes of a hologram would have been completely destroyed if such pressure and temperatures were used to laminate a hologram between two sheets of glass.

Surprisingly, however, it has been found that the hologram is laminated very securely between the two sheets of glass with no entrapped air. The hologram can be reconstructed as a bright hologram with no change in peak wavelength replay.

In one experiment, a silver halide reflection hologram 8 × 12 inches in size bearing a hologram on polyester base which had a peak replay wavelength of 540 nm, was prepared. Two sheets of clear glass 20 × 30 cm and two sheets of polyvinyl butyral of the same dimensions were cut from bulk stock. The sheets of polyvinyl butyral were 1.0 mm thick and were textured on each side.

An assembly was made of one sheet of glass, a sheet of polyvinyl butyral, the film hologram, a sheet of polyvinyl butyral and a sheet of glass. This assembly was then heated to 150° C. and subjected to a pressure of 13 bars. On cooling the lamination was inspected. The hologram film was secured completely between the sheets of glass and no entrapped air was visible. When the hologram was reconstructed, a very bright hologram having a peak replay wavelength of 540 nm was observed.

What is claimed:

1. A method of preparing a laminated hologram wherein a silver halide hologram is laminated between two sheets of glass, comprising the steps:
   forming an assembly which comprises a first sheet of glass, a first sheet of polyvinyl butyral, a translucent film which contains the silver halide hologram, a second sheet of polyvinyl butyral and a second sheet of glass, wherein only the translucent film containing the silver halide hologram is sandwiched between the first and second sheets of polyvinyl butyral, and
   subjecting the assembly to a pressure of between 12 and 15 bars at a temperature above the softening temperature of the first and second sheets of polyvinyl butyral.

2. A method according to claim 1 wherein the pressure is about 13 bars.

3. A method according to claim 1 wherein the temperature is between about 110 and 150° C.

4. A method according to claim 1 wherein at least one of the first and second polyvinyl butyral sheets has a textured surface.

5. A method according to claim 4 wherein each of the first and second polyvinyl butyral sheets is between about 0.5 and 3.0 mm thick.

6. A method for making a laminated silver halide hologram which comprises the method steps:
   providing a first assembly and a second assembly, each of said first and second assemblies comprising a sheet of translucent material bearing a film of polyvinyl butyral on one surface,
   positioning the polyvinyl butyral surface of said first assembly on a first surface of a transparent sheet comprising the silver halide hologram,
   positioning the polyvinyl butyral surface of said second assembly on a second surface of said transparent sheet to form a sandwich construction, so that only the transparent sheet comprising the hologram is between the polyvinyl butyral surfaces of the first and second assemblies,
   heating said sandwich construction to a temperature above the softening temperature of said polyvinyl butyral film surfaces, and
   subjecting said sandwich construction to a pressure between 13 and 15 bars.

* * * * *